United States Patent
Bourgois et al.

(10) Patent No.: US 11,268,699 B2
(45) Date of Patent: Mar. 8, 2022

(54) INJECTION SYSTEM FOR A TURBINE ENGINE ANNULAR COMBUSTION CHAMBER

(71) Applicant: SAFRAN AIRCRAFT ENGINES, Paris (FR)

(72) Inventors: Sébastien Alain Christophe Bourgois, Moissy-Cramayel (FR); Romain Nicolas Lunel, Moissy-Cramayel (FR); Haris Musaefendic, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/049,442

(22) PCT Filed: Apr. 10, 2019

(86) PCT No.: PCT/FR2019/050839
§ 371 (c)(1),
(2) Date: Oct. 21, 2020

(87) PCT Pub. No.: WO2019/207230
PCT Pub. Date: Oct. 31, 2019

(65) Prior Publication Data
US 2021/0262665 A1    Aug. 26, 2021

(30) Foreign Application Priority Data
Apr. 24, 2018 (FR) ........................... 1853573

(51) Int. Cl.
*F23R 3/00* (2006.01)
*F23R 3/14* (2006.01)
(Continued)

(52) U.S. Cl.
CPC .................. *F23R 3/14* (2013.01); *F02C 7/22* (2013.01); *F23R 3/286* (2013.01); *F05D 2220/32* (2013.01); *F05D 2240/35* (2013.01)

(58) Field of Classification Search
None
See application file for complete search history.

(56) References Cited

U.S. PATENT DOCUMENTS

| | | | |
|---|---|---|---|
| 3,703,259 A | 11/1972 | Sturgess et al. | |
| 4,713,938 A * | 12/1987 | Willis | F23R 3/28 60/742 |

(Continued)

FOREIGN PATENT DOCUMENTS

| | | |
|---|---|---|
| EP | 0286569 A2 | 10/1988 |
| EP | 1600693 A2 | 11/2005 |

(Continued)

OTHER PUBLICATIONS

International Search Report dated Jun. 25, 2019, issued in corresponding International Application No. PCT/FR2019/050839, filed Apr. 10, 2019, 3 pages.

(Continued)

*Primary Examiner* — Edwin Kang
(74) *Attorney, Agent, or Firm* — Christensen O'Connor Johnson Kindness PLLC

(57) ABSTRACT

An injection system for a turbine engine annular combustion chamber includes
  a support configured to support and to center a fuel injector head. The support includes a frustoconical surface connected at its downstream end of smallest diameter to an upstream end of a cylindrical surface.
The system further includes a bowl configured to mix air and fuel arranged downstream of the support and
  at least one axial swirl inducer extending at least in part around the support. Each swirl inducer includes vanes (Continued)

delimiting between them substantially axial channels for the passage of an air flow.

The channels open at their upstream ends on said frusto-conical surface.

13 Claims, 3 Drawing Sheets

(51) Int. Cl.
*F02C 7/22* (2006.01)
*F23R 3/28* (2006.01)

(56) References Cited

U.S. PATENT DOCUMENTS

| | | | |
|---|---|---|---|
| 6,068,467 A * | 5/2000 | Mandai | F23D 14/02 431/174 |
| 8,276,388 B2 | 10/2012 | Cayre et al. | |
| 8,312,723 B2 | 11/2012 | Pieussergues et al. | |
| 8,590,312 B2 | 11/2013 | Sandelis | |
| 2007/0000228 A1* | 1/2007 | Ohri | F23R 3/14 60/39.37 |
| 2007/0227147 A1 | 10/2007 | Cayre et al. | |
| 2008/0000234 A1 | 1/2008 | Commaret et al. | |
| 2009/0255102 A1 | 10/2009 | McMasters et al. | |
| 2009/0255116 A1 | 10/2009 | McMasters et al. | |
| 2009/0255118 A1 | 10/2009 | Kastrup et al. | |
| 2009/0255119 A1 | 10/2009 | McMasters et al. | |
| 2009/0255257 A1 | 10/2009 | McMasters et al. | |
| 2009/0255259 A1 | 10/2009 | Kastrup et al. | |
| 2009/0255260 A1 | 10/2009 | McMasters et al. | |
| 2009/0255261 A1 | 10/2009 | McMasters et al. | |
| 2009/0255265 A1 | 10/2009 | McMasters et al. | |
| 2009/0255602 A1 | 10/2009 | McMasters et al. | |
| 2009/0256003 A1 | 10/2009 | McMasters et al. | |
| 2009/0256007 A1 | 10/2009 | McMasters et al. | |
| 2010/0223933 A1* | 9/2010 | Umeh | F02C 9/40 60/794 |
| 2010/0280732 A1* | 11/2010 | Singh | F23N 5/082 701/100 |
| 2011/0040469 A1* | 2/2011 | Singh | F02C 9/00 701/100 |
| 2011/0185738 A1* | 8/2011 | Bastnagel | F01D 25/12 60/754 |
| 2014/0060060 A1* | 3/2014 | Bernero | F23R 3/12 60/748 |
| 2016/0273776 A1* | 9/2016 | Takiguchi | F23R 3/54 |
| 2017/0307219 A1* | 10/2017 | Tsunoda | F23R 3/286 |
| 2018/0187891 A1* | 7/2018 | Mitani | F02C 3/04 |

FOREIGN PATENT DOCUMENTS

| | | |
|---|---|---|
| EP | 1840467 A1 | 10/2007 |
| EP | 1873455 A1 | 1/2008 |
| EP | 3141818 A1 | 3/2017 |
| FR | 2918716 A1 | 1/2009 |
| FR | 2925146 A1 | 6/2009 |
| FR | 2941288 A1 | 7/2010 |
| FR | 2975467 A1 | 11/2012 |
| JP | 2011528098 A | 11/2011 |

OTHER PUBLICATIONS

Written Opinion of the International Searching Authority dated Jun. 25, 2019, issued in corresponding International Application No. PCT/FR2019/050839, filed Apr. 10, 2019, 6 pages.

International Preliminary Report on Patentability dated Oct. 27, 2020, issued in corresponding International Application No. PCT/FR2019/050839, filed Apr. 10, 2019, 1 page.

* cited by examiner

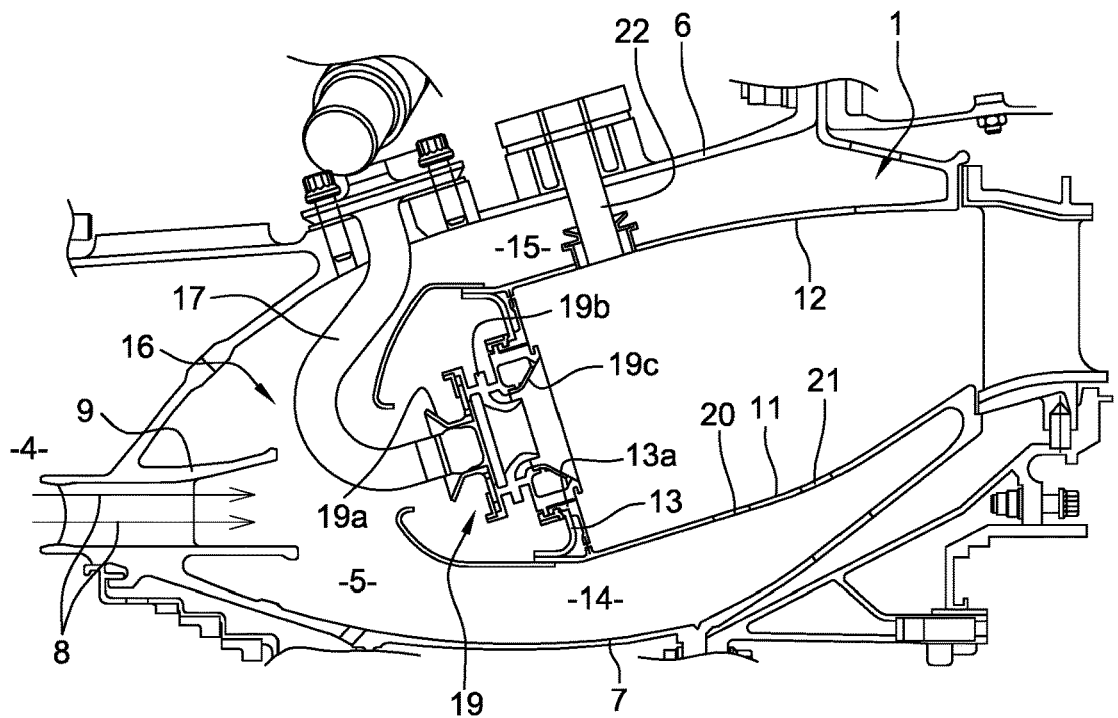
Fig. 1 - Prior Art -
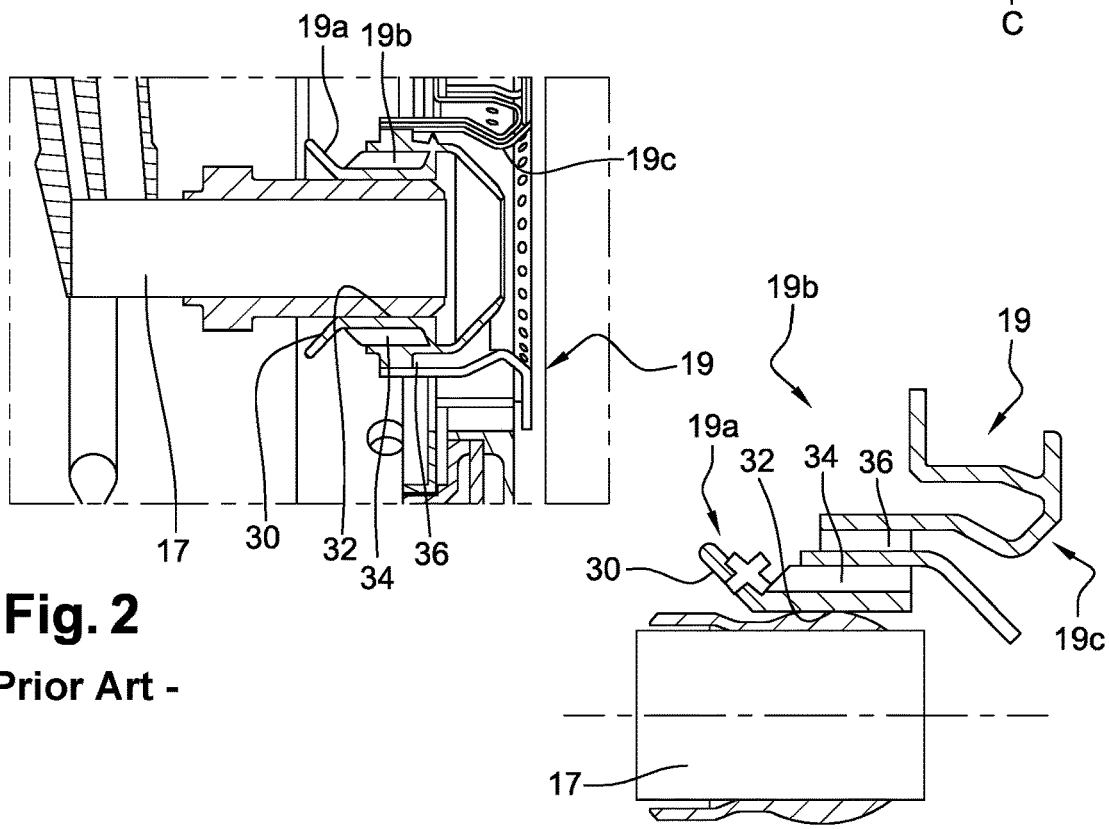
Fig. 2
- Prior Art -
Fig. 3
- Prior Art -

INJECTION SYSTEM FOR A TURBINE ENGINE ANNULAR COMBUSTION CHAMBER

TECHNICAL FIELD

The present invention relates to an injection system, in particular of a mixture of air and fuel, for an annular combustion chamber of a turbine engine.

BACKGROUND

The patent applications FR-A1-2 918 716, FR-A1-2 925 146, FR-A1-2 941 288, FR-A1-2 975 467, EP-A2-1 600 693, EP-A1-1 840 467, EP-A1-1 873 455, EP-A1-3 141 818, JP-A 2011 528098, U.S. Pat. No. 3,703,259 and EP-A2-0 286 569 describe injection systems for turbine engine.

A turbine engine comprises a gas generator comprising, in particular, one or more compressors, e.g. low pressure and high pressure, arranged upstream of a combustion chamber.

By convention, in this patent application, the terms "upstream" and "downstream" are defined with respect to the direction of gas circulation in the turbine engine. Similarly, by convention in this patent application, the terms "inner" and "outer" are defined radially with respect to the longitudinal axis of the turbine engine, which is in particular the axis of rotation of the rotors of the compressors.

Traditionally, the combustion chamber is annular and placed in an annular enclosure radially delimited by an outer annular casing and an inner annular casing. The combustion chamber is delimited by coaxial inner and outer annular walls joined upstream by a chamber bottom, also annular, and substantially transverse.

The combustion chamber is in particular supplied with compressed air, for example from a high-pressure compressor located upstream of the combustion chamber via in particular, an annular diffuser, and with fuel via injection systems distributed angularly around the axis of revolution of the chamber.

A conventional injection system comprises means for supporting and centering an injector head, and primary and secondary swirl inducers that deliver each of the air flow downstream of the injector in order to produce a mixture of air and fuel to be injected and then burned in the combustion chamber. A frustoconical shaped mixing bowl is mounted downstream of the swirl inducers to spray the mixture of air/fuel entering the combustion chamber.

The swirl inducers of the injection system each comprise a plurality of vanes delimiting between them inclined air passage channels to impart a rotational movement to the air around the axis of the swirl inducer, thus creating a recirculation zone to stabilize the flame, and a shear zone to promote atomization of the fuel layer in the chamber.

Two types of swirl inducers are known for an injection system of the above-mentioned type, the radial swirl inducers and axial swirl inducers. The terms "radial" and "axial" are defined here with respect to the axis of the injection system and not of the turbine engine. The radial swirl inducers are arranged axially one behind the other and have channels that extend radially. The axial swirl inducers are arranged radially around each other and have channels that extend axially.

The aforementioned means for supporting and centering the injector head comprise a frustoconical surface which is flared upstream and is connected by its downstream end, which is therefore the one with the smallest diameter, to the upstream end of a cylindrical surface. The injector head is capable of slidingly cooperating with the frustoconical surface to centre the injector and then with the cylindrical surface. The injector head is then inserted into the supporting and centering means.

In the current technique of an axial swirl inducers injection system, the axial swirl inducers are arranged around the cylindrical surface and downstream of the frustoconical surface. The frustoconical surface has an outer diameter greater than the diameter of the primary (or radially inner) swirl inducer so that this frustoconical surface and thus the supporting and centering means "hide" the primary/inner swirl inducer and hinder its air supply, as well as, to a lesser extent, the secondary/external swirl inducer. The current lines supplying the axial swirl inducers are thus diverted by the supporting and centering means.

The objective of the present invention is to provide a simple, effective and economical solution to this problem.

DISCLOSURE OF THE INVENTION

For this purpose, the invention provides an injection system for an annular combustion chamber of a turbine engine, comprising:
  means for supporting and centering a fuel injector head, these means comprising a frustoconical surface connected at its downstream end of smallest diameter to an upstream end of a cylindrical surface,
  a bowl for mixing air and fuel arranged downstream of said means, and
  at least one axial swirl inducer extending at least in part around said means, said or each swirl inducer comprising vanes delimiting between them substantially axial channels for the passage of an air flow,
  characterized in that said channels open at their upstream ends on said frustoconical surface.

The invention makes it possible to retain the functions and advantages of the supporting and centering means and of the swirl inducers, by eliminating the disadvantage mentioned above. For this purpose, the channels of the swirl inducer or swirl inducers open at the upstream on the frustoconical surface. They are thus no longer hindered by the supporting and centering means, as they can be supplied with air flowing axially around and along the injector.

The system according to the invention may comprise one or more of the following features, taken in isolation from each other or in combination with each other:
  the system comprises two axial and coaxial swirl inducers, the channels of which open at their upstream ends on said frustoconical surface,
  said vanes extend to said frustoconical surface and partially define said frustoconical surface,
  said frustoconical surface comprises at least one annular row of orifices for supplying air to said channels,
  said vanes are axially recessed with respect to said frustoconical surface; the term "axial" is here defined with respect to the axis of the injection system,
  said frustoconical surface comprises at least one annular opening for supplying air to said channels,
  said vanes are interrupted and each comprise at least two vane portions arranged axially from upstream to downstream, i.e. one behind the other,
  said or each swirl inducer is defined between two cylindrical walls, respectively outer and inner, extending one around the other, the outer wall comprising an annular row of through apertures for supplying air to this swirl inducer, said frustoconical surface is interrupted by a notch configured to receive said fuel injector.

The invention also relates to a turbine engine comprising a combustion chamber equipped with a system as previously described.

DESCRIPTION OF THE FIGURES

The invention will be better understood and other details, characteristics and advantages of the invention will appear more clearly when reading the following description made as a non-limitative example and with reference to the appended drawings in which:

FIG. 1 is a detailed view of a longitudinal half-section of a turbine engine illustrating in particular a combustion chamber of the turbine engine, this turbine engine being equipped with radial swirl inducer injection systems;

FIG. 2 is a detailed view of an axial swirl inducers injection system of a turbine engine combustion chamber;

FIG. 3 is a simplified view of the system of FIG. 2;

DETAILED DESCRIPTION

Figure 4:
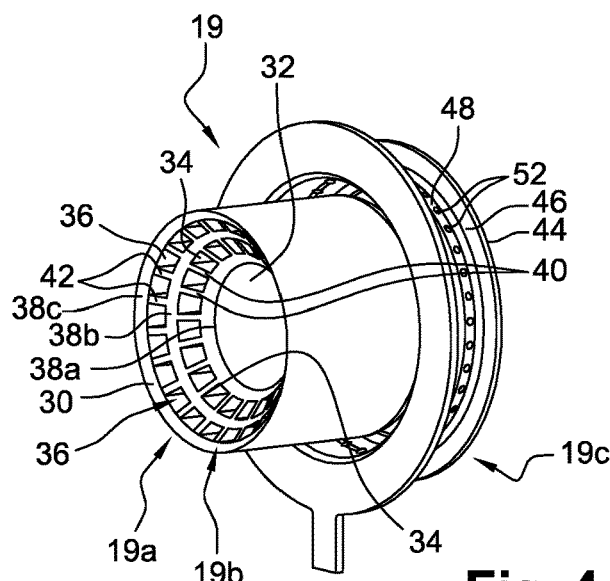
FIGS. 4 and 5 are schematic views of a first embodiment of the invention, respectively in perspective and in axial section.

On FIG. 1 is represented an annular combustion chamber 1, of axis C of revolution, of a gas generator of an aircraft turbine engine.

The combustion chamber 1 is placed downstream of one or more compressors, for example low pressure and high pressure, and upstream of one or more turbines, for example low pressure and high pressure.

The axis C of revolution of the combustion chamber 1 is coincident with the longitudinal axis of the turbine engine, which is in particular the axis of rotation of the rotors of the compressors and turbines.

According to the embodiment illustrated on the figures and in particular FIG. 1, the combustion chamber 1 is placed in particular downstream of a high pressure centrifugal compressor 4.

More precisely, the chamber 1 is placed in an annular enclosure 5 radially delimited by an outer annular casing 6 and an inner annular casing 7. The flow of compressed air 8 generated by the compressor 4 opens into the enclosure 5 via an annular diffuser 9.

The combustion chamber 1 is delimited by coaxial inner and outer annular walls 11, 12 joined upstream by a substantially transverse bottom 13 of the combustor 1.

More precisely, according to the embodiment illustrated in the figures, the chamber 1 is substantially radially centred in the enclosure 5 so as to define on the one hand an annular inner air passage 14 delimited radially by the inner wall 11 and the inner casing 7, and on the other hand an annular outer air passage 15 delimited radially by the outer wall 12 and the outer casing 6.

The chamber 1 is supplied with a mixture of air and fuel by several injection devices 16 of air and fuel evenly distributed angularly around the axis C. Specifically, each injection device 16 comprises a fuel injector 17 and an air injection system 19.

The injector 17 is angled and has one end attached to the outer casing 6 and an opposite end forming a head that is engaged and centred in the injection system 19.

The injection system 19 is fixed to the bottom 13 and more precisely mounted in an orifice 13a of the bottom 13, to allow the mixture of air and fuel to be sprayed into the chamber 1.

The injection system 19 comprises, from the upstream to the downstream means 19a for supporting and centering the head of the injector 17, means 19b for injecting air, and means 19c for diffusing an air-fuel mixture into the chamber.

The chamber 1 is thus supplied with compressed air by the injection system 19, this compressed air being mixed with the fuel supplied by the injectors 17.

The chamber 1 is also supplied with compressed air via in particular so-called "primary" holes 20 (for example a circumferential row on the inner wall 11 and on the outer wall 12) and via "dilution" holes 21 (for example a circumferential row on the inner wall 11 and on the outer wall 12) located downstream of the primary holes 20. The primary and dilution holes 20, 21 are supplied with air via the inner and outer air passages 14, 15.

The combustion of the air/fuel mixture is initiated via one or more ignition devices 22 attached to the outer wall 12. According to the example shown, the ignition devices 22 are located longitudinally at the level of the primary holes 20.

In order to cool the inner and outer walls 11, 12 of the combustion chamber 1, the latter comprise a plurality of cooling holes, generally inclined, distributed in the form of circumferential rows, so as to achieve cooling commonly known as "multi-perforation".

FIG. 1 represents a first type or first technology of injection system 19 in which the air injection means 19b are with radial swirl inducers (with respect to the axis of the injection system).

FIGS. 2 and 3 represent a second type or second technology of injection system 19 in which the air injection means 19b are with axial swirl inducers (with respect to the axis of the injection system).

Classically, the means 19a for supporting and centering the injector head comprise a frustoconical surface 30 connected at its downstream end of smallest diameter to an upstream end of a cylindrical surface 32. The axial swirl inducers, respectively inner 34 and outer 36, extend around the surface 32 and downstream of the surface 30. The frustoconical surface 30 has an inner diameter that is equal to the inner diameter of the surface 32, and is smaller than the inner and outer diameters of the swirl inducers 34, 36. The frustoconical surface 30 has an outer diameter that is greater than the outer diameter of the swirl inducer 34, and even greater than the inner diameter of the swirl inducer 36, as shown in the figures.

The major disadvantage of the latter technology is connected to the fact that the frustoconical surface 30 extends upstream of the swirl inducers and hinders their air supply, which is schematically represented by the cross in FIG. 3. This has a negative impact on the overall performance of the injection system and therefore of the combustion chamber as a whole.

Figure 5:
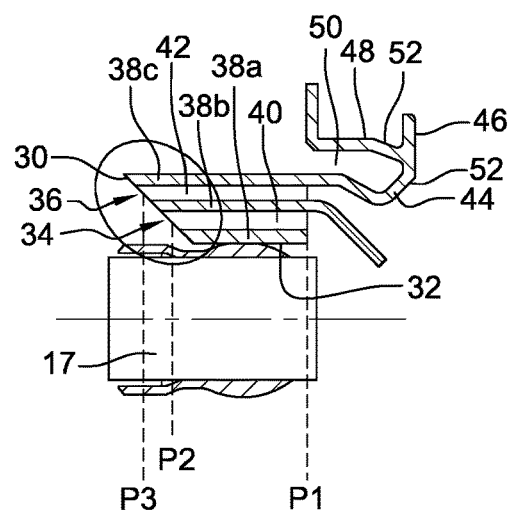

FIGS. 4 and 5 illustrate a first embodiment of the invention in which the elements already described in the above are designated by the same reference figures.

The supporting and centering means 19a of the injection system 19 comprise a frustoconical surface 30 and a coaxial cylindrical surface 32, the cylindrical surface extending downstream from the smallest diameter end of the frustoconical surface.

The inner swirl inducer 34 and outer swirl inducer 36 extend coaxially around each other and around the cylindrical surface 32.

The inner swirl inducer 34 is delimited by two coaxial annular walls 38a, 38b, which are connected to each other by vanes 40. The inner wall 38a is substantially cylindrical and the outer wall 38b comprises a cylindrical upstream portion extending around the wall 38a, and a frustoconical portion extending downstream of the wall 38a and oriented from the upstream to the downstream towards the inside.

The outer swirl inducer 36 is delimited by the wall 38b and another, coaxial, annular wall 38c, the walls 38b, 38c being connected to each other by vanes 42. The outer wall 38c comprises a cylindrical upstream portion extending around the wall 38b, and a downstream portion connected to the bowl 44 of the diffuser means 19c.

In the example shown, the bowl 44 is frustoconical and flared downstream. It is connected to an external annular collar 46 and a cylindrical wall 48 for mounting the injection system 19 in the above-mentioned opening 13a of the combustor bottom 13. The downstream portion of the wall 38c and/or the bowl 44 define(s) with the wall 48 an annular cavity 50 for the circulation of air, this air being intended to pass through bores 52 in the bowl or the wall, in particular to impact and thus cool the collar 46 intended to be located inside the combustion chamber.

The vanes 40, 42 of the swirl inducers 34, 36 define between them channels which extend axially. The downstream ends of the channels as well as the vanes 40, 42 are located in a transverse plane P1, perpendicular to the axis of the system.

The upstream ends of the channels as well as of the vanes 40, 42 are located on the frustoconical surface 30. The upstream ends of the channels and the vanes 40, 42 are located in transverse planes P2 and P3 on the surface 30. In other words, the channels of the swirl inducers open into their upstream ends on the frustoconical surface.

FIG. 4 illustrates the fact that the frustoconical surface 30 is partly formed by the upstream ends of the walls 38a, 38b and 38c and the upstream ends of the vanes 40, 42. Thus, each of the walls 38a, 38b and 38c has its upstream end which is bevelled and inclined from upstream to downstream towards the inside of the axis of the system. The upstream end of each vane 40, 42 is bevelled and inclined from upstream to downstream towards the inside of the axis of the system. The bevelled ends have identical cone angles.

The surface 32 comprises two annular rows of orifices for supplying air to the swirl inducer channels.

Figure 6:
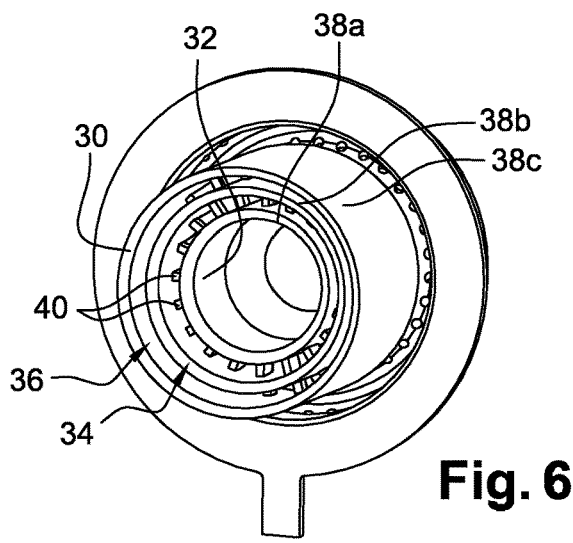
FIGS. 6 and 7 are schematic views of a second embodiment of the invention, respectively in perspective and in axial section.
Figure 7:
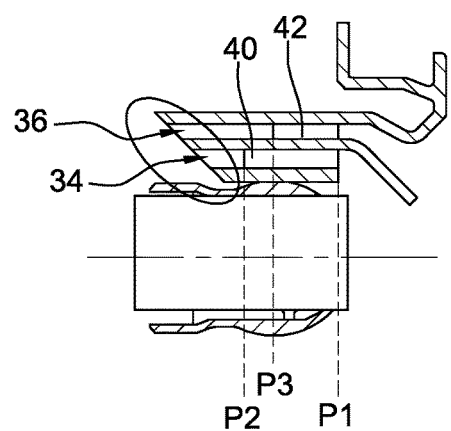

The alternative embodiment of FIGS. 6 and 7 differs from the previous embodiment mainly by the length of the vanes 40, 42.

The downstream ends of the channels and the vanes 40, 42 are located in a transverse plane P1, perpendicular to the axis of the system. The upstream ends of the channels are located on the frustoconical surface 30, but the upstream ends of the vanes are set back with respect to the surface 30. The upstream ends of the vanes 40, 42 are located in transverse planes P2 and P3 set back with respect to the surface 30. In the example shown, P2 is upstream of P3 but the reverse is possible.

The frustoconical surface 30 comprises two annular openings for supplying air to the swirl inducer channels.

Figure 8:
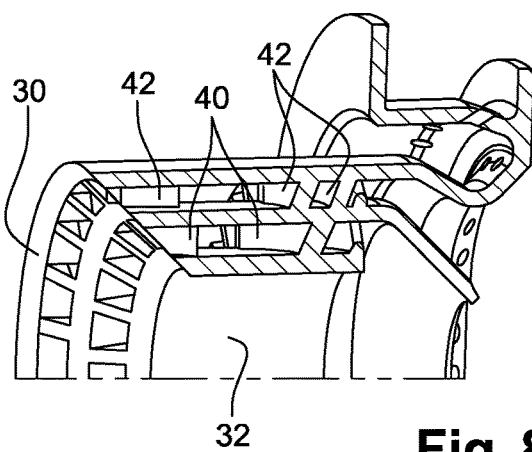
FIGS. 8 and 9 are schematic views of a third embodiment of the invention, respectively in perspective and in axial section.
Figure 9:
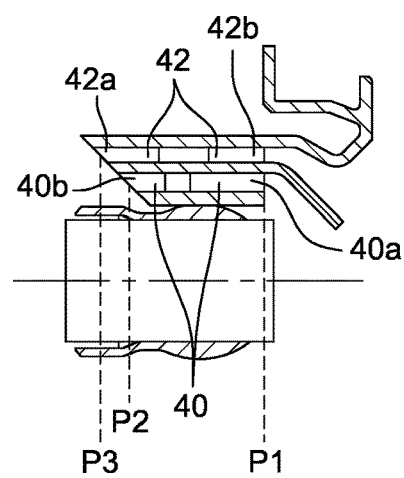

The alternative embodiment of FIGS. 8 and 9 differs from the first embodiment mainly by the vanes 40, 42. These vanes which are interrupted here and each comprise at least two portions of vanes 40a, 40b, 42a, 42b arranged axially one behind the other. The downstream ends of the channels as well as of the vanes 40, 42 are located in a transverse plane P1, and the upstream ends of the channels as well as of the vanes 40, 42 are located in transverse planes P2 and P3 located on the surface 30.

Figure 10:
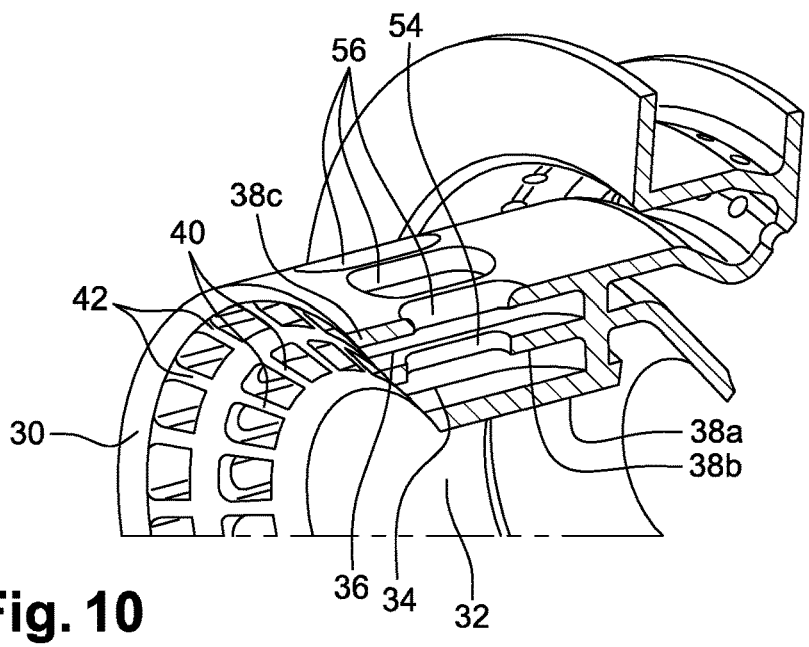
FIG. 10 is a schematic perspective view of a fourth embodiment of the invention.

The alternative embodiment of FIG. 10 differs from the first embodiment essentially by the walls 38b, 38c, which here each comprise an annular row of through apertures 54, 56 for supplying air. The apertures 54 of the wall 38b allow the air supply to the inner swirl inducer 34 and the apertures 56 of the wall 38c allow the air supply to the outer swirl inducer 36, as well as to the inner swirl inducer 34, because the air that passes through the apertures 54 must first pass through the apertures 56.

Figure 11:
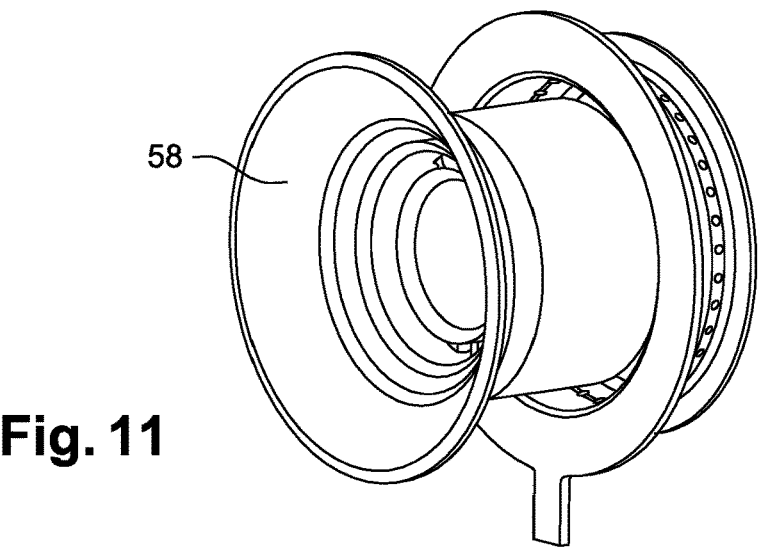
FIG. 11 is a schematic perspective view of a fifth embodiment of the invention.

The alternative embodiment of FIG. 11 differs from the second embodiment of FIGS. 6 and 7 essentially by the fact that the wall 38c is connected to the end of smallest diameter of a centering cone 58 which is flared upstream. The cone 58 has a cone angle identical to that of the bevelled ends of walls 38a, 38b and 38c and extends in continuity with these ends so that the frustoconical surface 30 of the supporting and centering means is also formed and extends into this cone.

Figure 12:
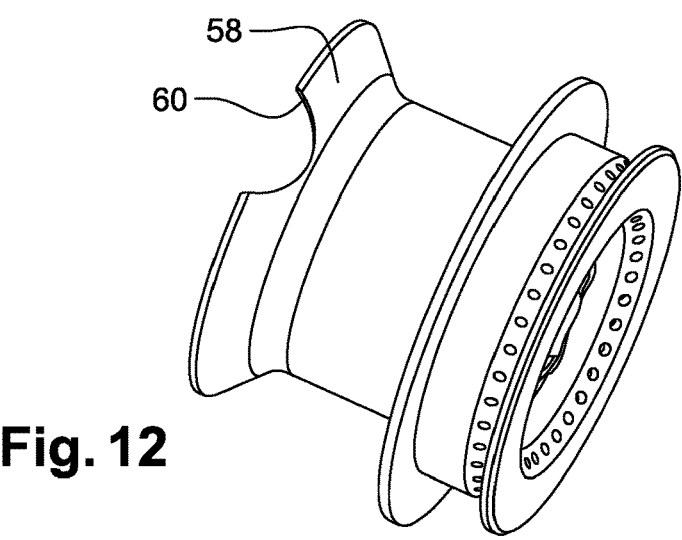
FIG. 12 is a schematic view in perspective of a sixth embodiment of the invention.

The alternative embodiment of FIG. 12 differs from the previous embodiment of FIG. 11 essentially by the fact that the cone 58 comprises a notch 60 configured to receive the fuel injector 17, and in particular its elbow arm that supports the head.

In all the embodiments described above, air is able to penetrate axially into the swirl inducers, without bypassing the walls, along the injector head. This air is set in rotation by the vanes of the swirl inducers and a swirling flow of air is delivered downstream of the injection head in order to mix the air with the fuel injected into the chamber, the mixture being sprayed in the form of a cone thanks in particular to the bowl 44. In the alternative embodiment of FIG. 10, the apertures 54, 56 allow to increase the flow rate for supplying air to the swirl inducers.

The invention claimed is:

1. An injection system for an annular combustion chamber of a turbine engine, comprising:
   a support configured to support and to center a fuel injector head, the support comprising a frustoconical surface and a cylindrical surface, said frustoconical surface having a downstream end of smallest diameter which is connected to an upstream end of said cylindrical surface, said cylindrical surface being configured to cooperate by sliding with said fuel injector head,
   a mixing bowl configured to mix air and fuel, said mixing bowl being arranged downstream of the support, and
   a first swirl inducer extending at least in part around the support, said first swirl inducer comprising first vanes delimiting therebetween first substantially axial channels configured for a first passage of a first air flow,
   a second swirl inducer extending at least in part around said first swirl inducer, said second swirl inducer comprising second vanes delimiting therebetween second substantially axial channels configured for a second passage of a second air flow,
wherein upstream ends of said first and second substantially axial channels open on said frustoconical surface which has a simile cone angle.

2. The injection system according to claim 1, wherein said first and second vanes extend to said frustoconical surface and partially define said frustoconical surface.

3. The injection system according to claim 2, wherein said first and second vanes have bevelled upstream ends, said bevelled upstream ends and said frustoconical surface having said single cone angle.

4. The injection system according to claim 1, wherein said frustoconical surface comprises at least one annular row of orifices configured to supply the first and second air flows to said first and second substantially axial channels, respectively.

5. The injection system according to claim 1, wherein said first and second vanes are axially recessed with respect to said frustoconical surface.

6. The injection system according to claim 5, wherein said frustoconical surface comprises at least one annular opening configured to supply the first and second air flows to said first and second substantially axial channels, respectively.

7. The injection system according to claim 1, wherein said first and second vanes are interrupted and each of said first and second vanes comprises at least two vane portions arranged axially from upstream to downstream.

8. The infection system according to claim 1, wherein each of said first and second swirl inducers is defined between an inner cylindrical wall and an outer cylindrical wall.

9. The injection system according to claim 8, wherein each of said cylindrical outer walls of said first and second swirl inducers comprises an annular row of through apertures configured to supply the air to said first and second swirl inducers, respectively.

10. The injection system according to claim 8, wherein each of said cylindrical inner and outer walls comprises bevelled upstream ends, said bevelled upstream ends and said frustoconical surface having said single cone angle.

11. The infection system according to claim 1, wherein said frustoconical surface is interrupted by a notch configured to receive said fuel injector head.

12. The injection system according to claim 1, wherein said frustoconical surface has an upstream end of largest diameter which is connected to a cone, said cone and said frustoconical surface having said single cone angle.

13. A turbine engine, comprising an annular combustion chamber equipped with at least one injection system, the at least one injection system comprising:
a support configured to support and to center a fuel injector head, the support comprising a frustoconical surface and a cylindrical surface, said frustoconical surface having a downstream end of smallest diameter which is connected to an upstream end of said cylindrical surface, said cylindrical surface being configured to cooperate by sliding with said fuel injector head,
a mixing bowl configured to mix air and fuel, said mixing bowl being arranged downstream of the support, and
a first swirl inducer extending at least in part around the support, said first swirl inducer comprising first vanes delimiting therebetween first substantially axial channels configured for a first passage of a first air flow,
a second swirl inducer extending at least in part around said first swirl inducer, said second swirl inducer comprising second vanes delimiting therebetween second substantially axial channels configured for a second passage of a second air flow,
wherein upstream ends of said first and second substantially axial channels open on said frustoconical surface which has a single cone angle.

\* \* \* \* \*

UNITED STATES PATENT AND TRADEMARK OFFICE
CERTIFICATE OF CORRECTION

PATENT NO. : 11,268,699 B2
APPLICATION NO. : 17/049442
DATED : March 8, 2022
INVENTOR(S) : S. Bourgois et al.

It is certified that error appears in the above-identified patent and that said Letters Patent is hereby corrected as shown below:

In the Claims

| Column | Line | |
|---|---|---|
| 7 | 28 | In Claim 8, change "infection" to -- injection --. |
| 8 | 5 | In Claim 11, change "infection" to -- injection --. |

Signed and Sealed this
Fifteenth Day of August, 2023

Katherine Kelly Vidal
*Director of the United States Patent and Trademark Office*